May 17, 1960     B. F. QUINTILIAN     2,936,589
HYDRAULIC TRANSMISSION

Filed Dec. 28, 1954     6 Sheets-Sheet 1

INVENTOR
Bartholomew F. Quintilian
BY
HIS ATTORNEY

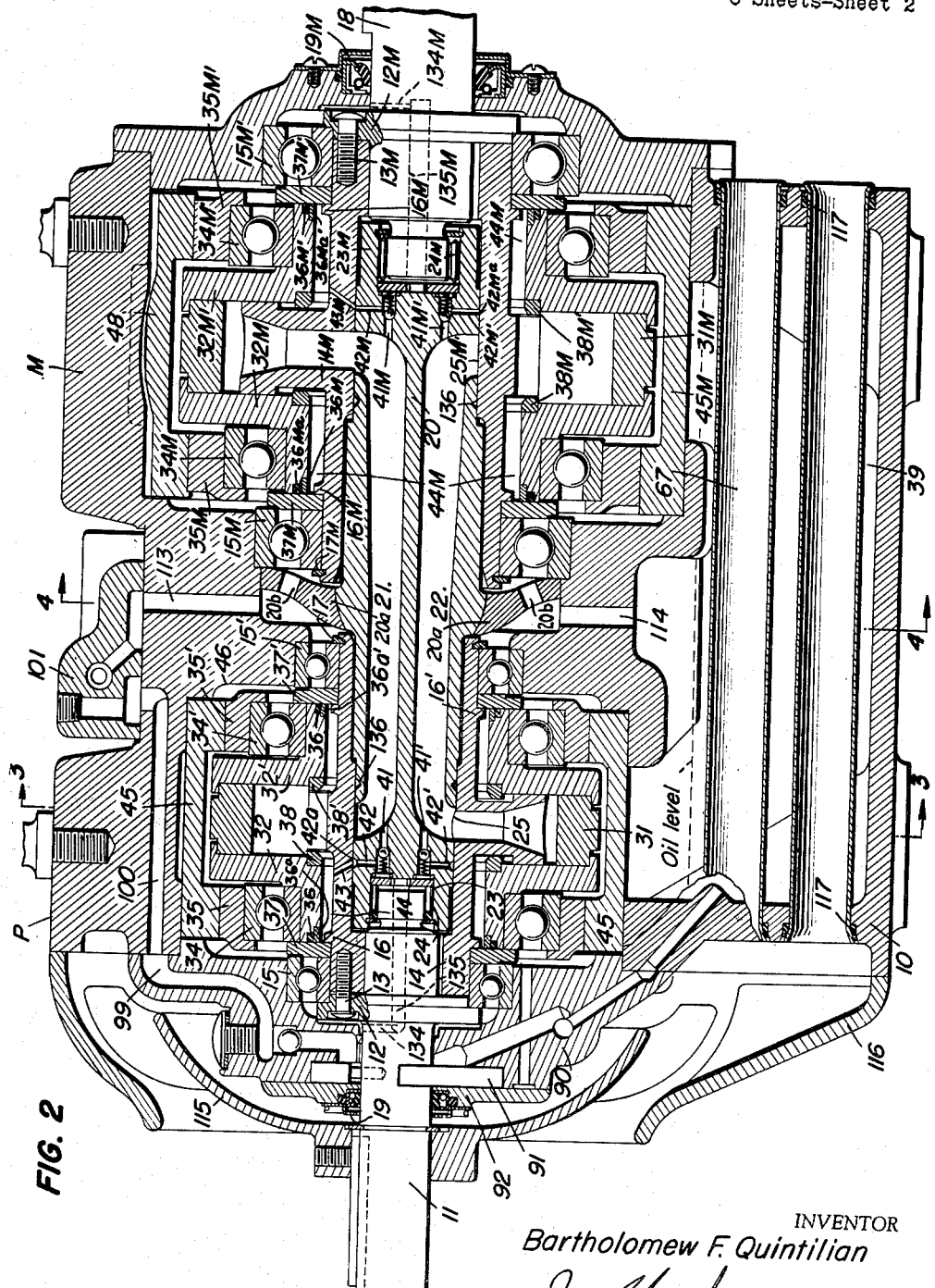

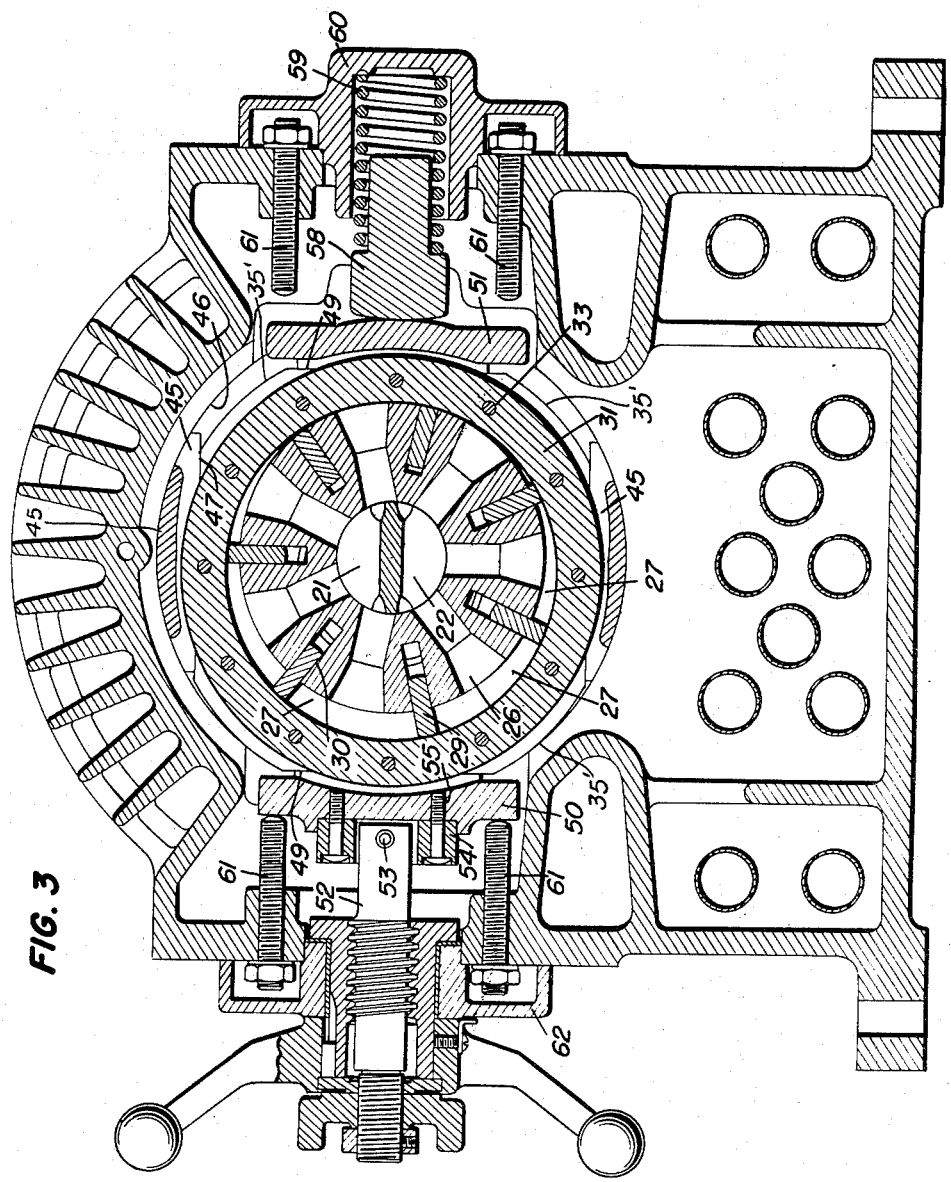

May 17, 1960
B. F. QUINTILIAN
2,936,589
HYDRAULIC TRANSMISSION
Filed Dec. 28, 1954
6 Sheets-Sheet 4
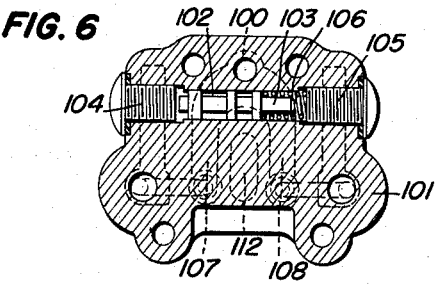
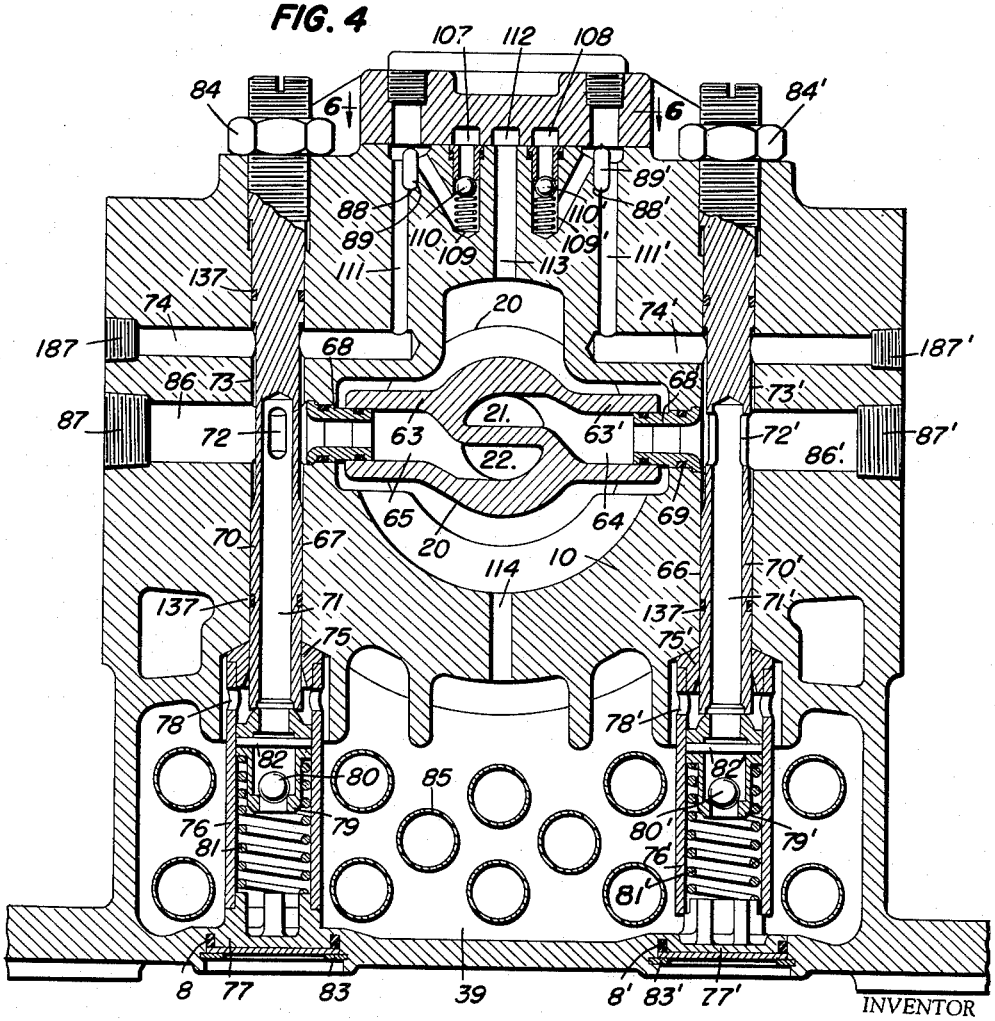
INVENTOR
Bartholomew F. Quintilian
BY
HIS ATTORNEY May 17, 1960 B. F. QUINTILIAN 2,936,589
HYDRAULIC TRANSMISSION
Filed Dec. 28, 1954 6 Sheets-Sheet 5

INVENTOR
Bartholomew F. Quintilian
BY
HIS ATTORNEY

INVENTOR
Bartholomew F. Quintilian
BY
HIS ATTORNEY

United States Patent Office 2,936,589
Patented May 17, 1960

2,936,589

HYDRAULIC TRANSMISSION

Bartholomew F. Quintilian, Baltimore, Md., assignor to Gerotor May Corporation of Maryland, a corporation of Maryland Application December 28, 1954, Serial No. 478,034

8 Claims. (Cl. 60—53)

My invention relates to vane type rotary fluid pressure devices such as pumps or fluid motors and more particularly to a hydraulic transmission pump and motor assembly in which the volumetric capacity or output per revolution can be regulated or varied.

An object of my invention is to provide a fluid operated power transmitting device which is simple in design and relatively inexpensive to manufacture and which can be regulated by either manual or automatic means to efficiently transmit power with a minimum loss of power from a driving member to a driven member at speed and torque ratios which are infinitely variable within the operating range of the device.

Another object is the provision of a hydraulic power transmission device in which the various elements contain inherent self-aligning characteristics to permit wider tolerances in manufacture and at the same time to provide highly effective sealing characteristics and in which the elements are so effectively designed that a minimum of noise and vibration results during the operation of the device.

Other objects and advantages of my invention, in part, will be obvious and in part pointed out hereinafter during the course of the following description.

The invention accordingly resides in the combination of elements, features of construction, and arrangements of parts, the scope of the application of all of which will be more fully set forth in the claims at the end of this specification.

For a more ready comprehension of my invention, reference is had to the accompanying drawings, wherein:

Fig. 2 is a longitudinal vertical section of the transmission as shown in Fig. 1.

Fig. 3 is a transverse sectional view taken substantially along line 3—3 of Fig. 2.

Fig. 4 is a transverse sectional view taken substantially along line 4—4 of Fig. 2.

Fig. 6 is a horizontal sectional view of my supercharger relief valve assembly taken substantially along line 6—6 of Fig. 4.

Figure 12:
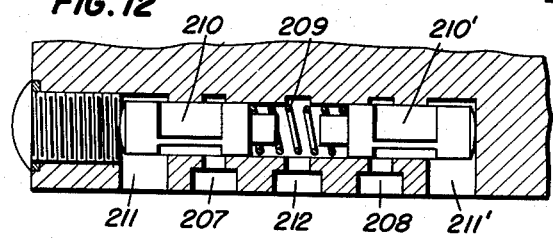

And Fig. 12 is a sectional view of a modified form of the check valves shown in the transmission of Fig. 4.

Like reference characters refer to like parts throughout the several views of the drawing.

As conducive to a clearer understanding of my invention, it may be noted at this point that in the past the necessity in many industrial applications for a fluid power transmission with a high degree of speed and torque control has brought about a wide acceptance of the vane type of rotary pump or motor. This type of device is characterized by a rotor in which is mounted a plurality of freely slidable radial vanes which are arranged to move outwardly and inwardly thereof during operation of the rotor within the stator. These vanes define the suction and pressure chambers in the pumps by cooperating with the stator or pump housing which is disposed around the rotor and vanes. By shifting the eccentricity of this pump cylinder relative to the rotor the volume and direction of delivery of the pump may be varied.

Although a single variable capacity vane pump can be employed to supply a fluid under high pressures another highly satisfactory arrangement has been to assemble two of these devices in a common housing as a unit and providing a fluid connection between the two units. With this structure, one device separately driven by an external power source usually at a constant speed pumps fluid under pressure through the provided passages to drive the other device as a motor in a closed circuit. By shifting the housings both on the pump and the motor a stepless variation in output speed is obtained at the motor power takeoff with respect to the prime mover operating the pump.

While this type of fluid transmission device has proven highly satisfactory, the rapid recirculation of the high pressure fluid through the unit has given rise to excessive noise and vibration during operation. Rapid speed changes and reversal of the direction of rotation tend also to create a violent agitation within the fluid, and cavitation results to reduce the efficiency of the unit.

With the large number of parts and the need for close tolerances due to the high pressure fluid, alignment has been a problem, particularly in view of the constant wear and continuous stresses inherent in a device of this type.

It is therefore an outstanding object of my invention to provide a rugged, light, fluid power transmission which is capable of stepless output regulation in either direction of rotation from zero to maximum speed and which is constructed of a comparatively small number of highly durable parts enabling it to operate with remarkable quietness and freedom from vibration and wear at all capacities and pressures within the intended range of operation.

Referring now more particularly to the practice of my invention, I provide in a coaxial relationship within a common housing two vane type rotary fluid units. One of these devices I will call a fluid motor as the term fluid motor is actually a pump with the fluid being supplied to it under pressure. Therefore, I provide a fluid connection between the two devices which conducts the pumped fluid from the pump to the motor continuously and in circulating manner. I provide a fluid reservoir within the unit housing to supply make-up fluid to replace that lost due to slippage. The fluid preferably employed is the readily available automobile oil or the like.

The cooperation between the pump rotor vanes and the vane rotor cylinder or casing produces the desired fluid compression and suction. And the delivery of pressurized fluid to the motor produces a similar action in that device. I arrange both the pump and motor vane rotor casing within the unit housing so that they are shiftable either by manual or automatic means to regulate the eccentricity with respect to the vane rotor. With this arrangement the pump has a variable delivery and the motor has a variable speed.

I lubricate the various parts of my invention by means of leakage fluid through passages provided for that purpose. Therefore, the oil necessary to make up this loss is obtained from the reserevoir through one of two vertical relief valve columns depending on the direction of the pumped fluid.

In order to reduce oil cavitation, supply necessary back pressure for operation and replenish slippage oil I provide a supercharger pump driven by the pump shaft. This pumps pressurized oil from the reservoir to keep the system charged. And I find this expedient effectively reduces noise. In order to ensure that the back pressure does not become excessive I provide a valve which opens under high pressure and spills the supercharger discharge back into the reservoir. Also, the principal valves are arranged to relieve the system when the internal fluid pressure exceeds a predetermined value.

My power transmission unit can be operated in either direction of rotation. In addition reversal is obtained at the output shaft for each direction by varying the eccentricity of the pump or motor vane rotor housings by the preferred embodiment of handwheels loosely connected to the casings.

As specifically illustrative of the practice of my invention, attention is directed to Figs. 1-6 of the drawing. The fluid pump P and fluid motor M of my invention are arranged within a housing 10 as shown in Fig. 2 The pump is located adjacent an input shaft 11 which can be connected to any suitable prime mover such as an internal combustion engine or an electric motor. Any direction of rotation may be used as my oil drive will operate equally well in both directions.

Near the end of shaft 11 adjacent the pump I provide a peripheral flange or shoulder 12 which is drawn into flush engagement with one end of the pump rotor 14 by means of radially disposed bolts 13.

The rotor 14 is a cylindrical member containing a central bore, one end of which receives and is keyed to the portion of the input shaft adjacent the shoulder 12. Therefore, the rotor and input shaft rotate together. The rotor is supported at either end by means of ball bearings 15 and 15$^1$ disposed within the housing 10. By providing external peripheral flanges 16 and 16$^1$ adjacent the rotor ends, and end discs 37, 37$^1$ respectively abutting the same, I obtain a tight gripping engagement for the inner race of the rotor bearings. This relieves the pump rotor from any possible damage due to external thrust on the input shaft. The inner race of the bearing 15 is tightly gripped between shoulder 12 of shaft 11 on the one hand and the end disc 37 as backed up by rotor shoulder 16 on the other hand. The inner race of rotor bearing 15$^1$ is seated between end disc 37$^1$ backed up by peripheral flange 16$^1$, and a wedge-type beveled snap ring 17 mounted in a peripheral groove on the rotor. The snap ring eliminates all the bearing inner race side clearance to thereby confine the side movement of the vane rotor under fluid pressure of the vane rotor casing end wall 32$^1$ and reduces wear. Moreover, this construction minimizes the leakage of high pressure oil from the pump at bearings 15 and 15$^1$.

The pump assembly P is confined to approximately one half of the housing 10. And disposed within the remaining portion is the motor M. The motor is a unit similar to the pump and contains an output shaft 18 supported with the motor vane rotor in a similar manner to that of the pump. The shaft 18 can be connected to the desired load satisfactory for my type of drive such as rotary machines, saws, winches, etc. The parts similar to that of the pump are designated by the same numerals with the suffix M.

To prevent oil leakage from around the shafts where they project from the housing I provide shaft seals 19 and 19M mounted on the end covers.

I provide a fluid connection between the pump and motor by means of a substantially stationary pintle 20. As seen in Fig. 2, this pintle is an elongated cylindrical member with a somewhat enlarged center portion containing two parallel passages 21 and 22. It is centrally disposed between the fluid pump and motor. And at each end of the pintle I provide supporting means in the form of recesses 23 and 23M into which is respectively inserted the extended inner ends of input shaft 11 and output shaft 18. Journalling of the pintle is provided by means of needle bearings 24 and 24M.

With the construction noted there is had a uniform clearance about each end of the pintle and firm support with freedom from mechanical vibration and chattering under all conditions of operation. Moreover, the uniform clearance assures an oil film of uniform thickness and less slippage oil. It is noted that the oil film does not serve as the support for the pintle.

Figure 10:
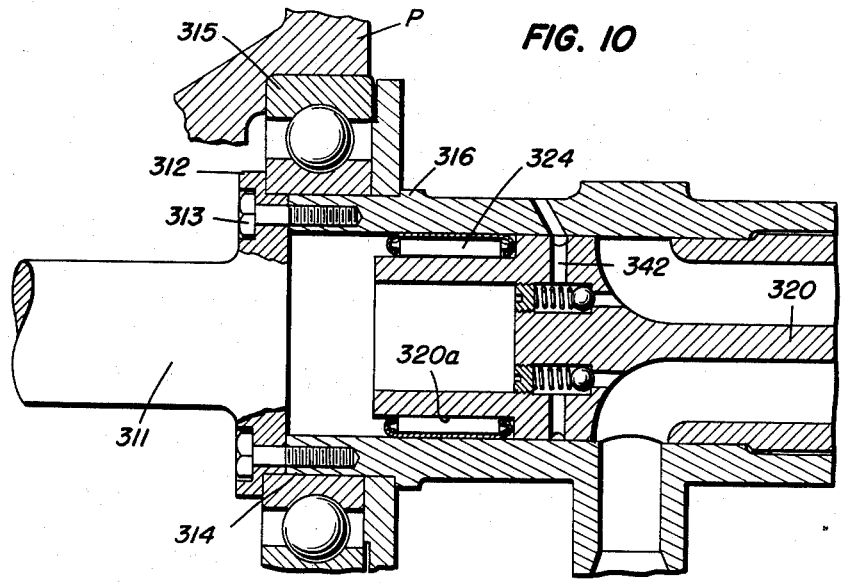
Fig. 10 is a detached sectional view of the pump end of a modified form of pintle support, certain parts being omitted for the sake of clarity.

The same benefits are had in a modified construction of pintle end support as illustrated in Fig. 10. It will be seen that drive shaft 311 conveniently terminates in flange 312 which is coupled by bolts 313 to rotor 314. And rotor 314 is axially supported at one end of pump housing P by way of roller bearing 315 held firmly in position on the rotor by a depression in the outer edge of flange 312 and an external peripheral flange 316 of the rotor. The pintle 320 is provided with reduced cup-portion 320$a$ which accommodates needle bearings 324 riding against the inner wall of the axial bore provided in rotor 314. With this modified construction there is realized a savings in cost of machining. And assembly is somewhat facilitated.

I also provide adjacent each end of the pintle peripheral V grooves 136 and 136M which I find results in an improved airseal to the suction side of the pump and motor. The pintle does not rotate but is held stationary by means of jumper tubes 68 and 68$^1$ inserted within the center portion of the pintle, as seen in Fig. 4. The mounting of these jumper tubes, however, permits a slight axial play for self-adjustment purposes. Also, by means of clearances at the ends of the pintle, some end play is permitted.

At the ends of the pintle central pasages 21 and 22 (Fig. 2) I provide a slight arcuate bend terminating in ports 25 and 25M which lead radially into the rotor centers. It is through these ports that the oil flows during circulation within the pump-motor circuit. As noted in Fig. 7 these ports 25 and 25M are elongated with sharp entering and trailing ends to effect a metering of the flow of fluid into the rotor chambers. I find that this construction reduces the objectionable hydraulic "hammering" effect generally encountered in pump-motor hydraulic transmissions of the prior art.

As shown in Fig. 3, the wheel-like center portion of the vane rotor 14 contains a plurality of radial passages 26 which provide fluid communication between the pintle passages 21 and 22 and a crescent-shaped group of working chambers 27. At any instant one half of these passages form suction conduits and the other half pressure conduits, depending upon the direction of rotation of shaft 11 and the position of the vane rotor casing which encompasses the rotor. Actually, therefore, the chambers 27 may be considered as forming two groups, one an inlet or suction group and the other an outlet or pressure group, respectively communicating with pintle passages 22 and 21 as hereinafter appears.

Alternately disposed between the passages 26 are the rotor vanes 29 slidable radially within the radial slots 30. These vanes are maintained in a tight fitting engagement with the inner wall of the vane rotor casing by means of fluid pressure at the base of the vanes, as explained in detail later in the specification, and constitute the sidewalls of the various chambers.

The vane rotor casing comprises a circular ring 31 which limits the outward movement of the vanes 29 and which is supported on either side by casing ends walls 32 and 32¹. I provide a tight fitting engagement between the ring 31 and end walls 32 by means of a plurality of radially disposed bolts 33. These end walls are rotatably supported by means of ball bearings 34 and 34¹ arranged within transversely movable vane rotor casing support rings 35 and 35¹. By shifting these support rings, as dealt with hereinafter, the eccentricity of the casing ring 31 with respect to the vane rotor can be adjusted.

In order to prevent the leakage of oil from under the end walls 32 and 32¹ I provide gasket seals 36 and 36¹ which fit within circular recesses provided in the hub ends of these walls. The gaskets are retained in position by means of their tubular rings 36a and 36a¹. The sealing gaskets cooperate with end discs 37 and 37¹ to provide a tight seal even with some relative moment between the casing ends and the rotor. I further provide vane rings 38 and 38¹ fitted within the rotor casing and movable therewith. These rings abut the inner ends of the vanes 29 and assist in maintaining the vanes in contact with the casing wall until the operating oil pressure becomes sufficient to force the vanes radially against the casing ring 31 as explained more fully hereinafter. It is to be noted that it is the full pressure of the pressurized conduit that acts on the bases of the vanes. Both the vane rotor and casing rotate together as a unit supported by bearings 15, 15¹ and 34, 34¹, respectively. This factor contributes materially to reduction of friction since the friction between the vanes and casing wall is eliminated, resulting in improved efficiency and considerably less wear.

Figure 8:
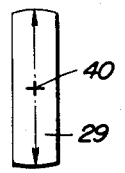
Fig. 8 is a side elevation view of a rotor vane of my invention.

As shown in Fig. 8, I provide on the rotor vanes 29 a top and bottom arcuate surface. These surfaces are of such design that they constitute the arcs of a cylinder which has at its center point the vane longitudinal axis 40 and diameter the height of the vanes. In starting the pump I, therefore, obtain a tangential contact between the bottom of the vanes and the rings 38 and 38¹ on the one hand, and the top surface of the vane and the inner bore or surface of the vane rotor casing 31 on the other. With continued operation of the pump tangential contact of the outer surfaces of the vanes is maintained with the inner bore of the rotor casing being held in tight engagement by pressure of the base of the vanes as noted above. Maximum pumping efficiency, with smooth operation therefore, is had under all conditions of operation.

If it be supposed that the casing 31 of the pump P is adjusted towards the left according to Fig. 3 and the vane rotor is driven in a clockwise direction, the group of working chambers 27, situated below the horizontal central plane, then exerts a suction effect and the group above this plane exerts a pressure effect. Driving fluid is then drawn through pintle passage 22 through the lower series of rotor passages 26 into the lower working chambers. The fluid is compressed within the upper group of working chambers and forced through the upper series of rotor passages 26 into pintle passage 21.

From passage 21 fluid under pressure therefore flows into the corresponding passages in the fluid motor M at the other end of the pintle. Since the motor is similar in construction to the fluid pump and merely operated reversely, the fluid pressure is converted into useful work through the output shaft 18. The motor discharge fluid flows back to the pump through what is now the pintle suction passage 22. It will be seen that the suction flow approximates a closed circuit, but due to leakage and lubrication it is necessary to continuously supply oil to the system from a reservoir 39, located within the lower portion of the housing as explained more fully hereinafter.

The rotor casing of both pump and motor can be moved from a position concentric with the rotor to positions which provide on either side of the rotor a group of working chambers. The output shaft is therefore arranged for either direction of rotation with respect to the direction rotation of the input shaft. If the rotary housing of the pump is adjusted so that it is concentric with the rotor there is no rotation of the motor. There would be no output from the fluid motor either with the motor casing in the concentric position. If the input speed is constant the varying of the pump rotor casing regulates the output speed at constant torque and the varying of the motor rotor casing regulates the speed to give constant horse-power output.

It can be seen therefore that when the pump casing is reversed from the position of Fig. 3, the pintle passage 21 becomes the suction conduit and the passage 22 the pressure conduit.

Figure 7:
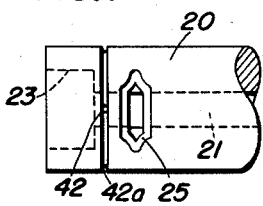
Fig. 7 is a partial view of the end portion of the pintle of my invention.

To assist in maintaining the vanes in proper contact with the casing I provide (Fig. 2) axial passages 41 and 41¹ and 41M and 41M¹ within the pintle ends which are connected to passages 42 and 42¹ and 42M and 42M¹ extending to circumferential grooves 42a and 42Ma around the end portions of the pintle external surface. Those on the pump end of the pintle are shown in Figs. 2 and 7. Ball check valves are disposed within passages 41 and 41¹ and 41M and 41M¹ for selecting the pressurized channel to give unidirectional flow. The groove 42a for the pump communicates with a tilted radial passage 43 within the vane rotor which in turn communicates with a pressure chamber 44 between the rotor casing and rotor. Like communication is established between motor end of the pintle and the chamber beneath the motor vanes.

If, for example, pressurized oil is flowing within pintle passage 21 the check valves in the passages 41 and 41M communicating therewith will open to allow oil to flow through passages 42 and 42M and 43 and 43M into chamber 44 and 44M and act on the lower surface of the vanes. The grooves 42a for the pump end and 42Ma for the motor end which extend around the pintle therefore allow fluid under pressure to flow from whichever pintle channel is under pressure. The check valves which communicate with the pintle suction passage 22 are in sealing engagement thereby preventing loss of fluid into channel 22.

It can therefore be seen if the unit is reversed by moving the pump casing over to the opposite side the pressures are reversed in the pintle passages 21 and 22, thereby reversing the operation of the check valves but full pressure is had beneath the vanes as before.

Where desired I employ a modified form of pintle valve construction (see Fig. 11) wherein pintle passageways 241 and 241¹ are provided, these communicating with a transverse passageway 242 in which is threaded at opposite ends the ball check valve seating elements 243 and 243¹. Each of these elements is provided with a short central bore 243a and 243a¹ leading from holes 243b and 243b¹ which are in immediate communication with the pintle passageways 241 and 241¹ respectively. Communication with the external circumferential groove 242a at the end of the pintle and thence to the tilted radial passage 43 of the vane rotor and to the pressure chamber 44 beneath lower surfaces of the various rotor vanes 29 is had by way of a further transverse passageway 244, this being substantially perpendicular to the passageway 242 and, of course, in the same place as that passageway. A check ball 245 which seats either against seating element 243 or against element 243¹ effects closure of passage 241 or 241¹ with consequent opening of the other in dependence upon the relative pressure conditions in pintle passageways 221 and 222.

Figure 11:
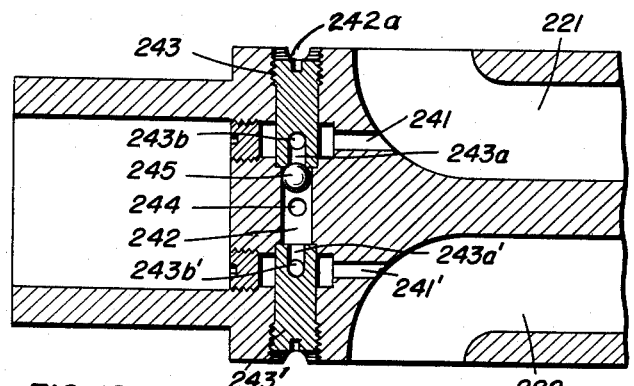
Fig. 11 is a detached sectional view of the pump end of a modified form of pintle valve arrangement.

It will be understood that with pressure conditions maintaining in passage 221 and sustaining in 222 ball check seats against elements 243¹ thereby effectively closing passageway 241¹. It is the pressure oil of pintle passageway 221 which courses through passage 241, seating element hole 243b and passage 243a, around ball 245 (which will have been seated on element 243¹ as noted) transverse passages 242 and 244 to circumferential groove 242a and thence to the under sides of the rotor vanes as described above. And it will be understood that with a reversal in pintle main passage pressures the flow of pintle pressure oil to the circumferential groove will be through passage 241$^1$, seating element passages 243$b^1$ and 243$a^1$, transverse passages 242 and 244 to groove 242a, the ball check 245 at that time being seated as shown in Fig. 11 of the drawing.

The modified form of pintle construction for the pump, where used of course, is also employed for the motor. In this way a balance of motor-pump operation is had.

With my modified form of construction, it is to be noted that closing of one pintle passageway positively assures opening of the other. Both passages may not be in closed position at the same time and by the same token neither may both of these passages be in open position at any time. My construction avoids any possibility of valve flutter as a result of pressure differences in the pressure side of the pintle, or in the suction side for that matter, which result from load varieties. And there is the further advantage that the pressure conditions obtaining at top and bottom of the vanes exactly balance, and as a consequence there is a minimum of wear at the bases of the vanes.

In order to provide guide means for the pump and motor rotor casings so that they can be moved laterally across the unit for variable control (see Fig. 3), I position an upper and lower shoe member 45 within a precision bored arcuate recess 46 in the main housing. These shoes present a flat bearing surface to corresponding flat portions 47 on the upper and lower surfaces of the movable vane rotor casing support ring 35. These shoes are self-aligning within the main housing to maintain a flush engagement with the ring 35.

Occasionally I find it desirable to partially fix the upper shoe member 45 for pump and motor each by way of a pair of bolts (not shown) respectively passing through pump and motor end plates and threadedly engaging the shoes on either side of the center lines of the shoes. In this manner circumferential back and forth play at low speed operation, due to light impulse shock as each vane compartment passes over the pintle parts, is effectively arrested. It will be understood that the comparative forces involved are such that the shoes readily align themselves with the vane housings although the fastening is sufficient to prevent any back and forth circumferential vibration which might arise from low speed operation.

Where desired, as an alternate embodiment, the shoe can be provided with a spherical outer diameter 48 as shown in Fig. 2 with the fluid motor. This construction provides complete self-alignment with lateral movement.

I also provide vertical surfaces 49 on either side of the support rings 35, 35$^1$ for direct contact with the stroking members 50 and 51. These are provided with corresponding flat surfaces to give firm contact. The rings 35, 35$^1$ are secured to the stroking members 50 and 51 and the position of the rings, and accordingly the casing, is set by adjustment of the stroking members. As seen in Fig. 3, a screw threaded shaft 52 is flexibly connected by means of pin 53 to a ring 54 secured by means of bolts 55 to stroking member 50. By means of this pin the vane rotor casing is not positively connected to the control shaft 52 and lateral movement is therefore permitted.

Figure 1:
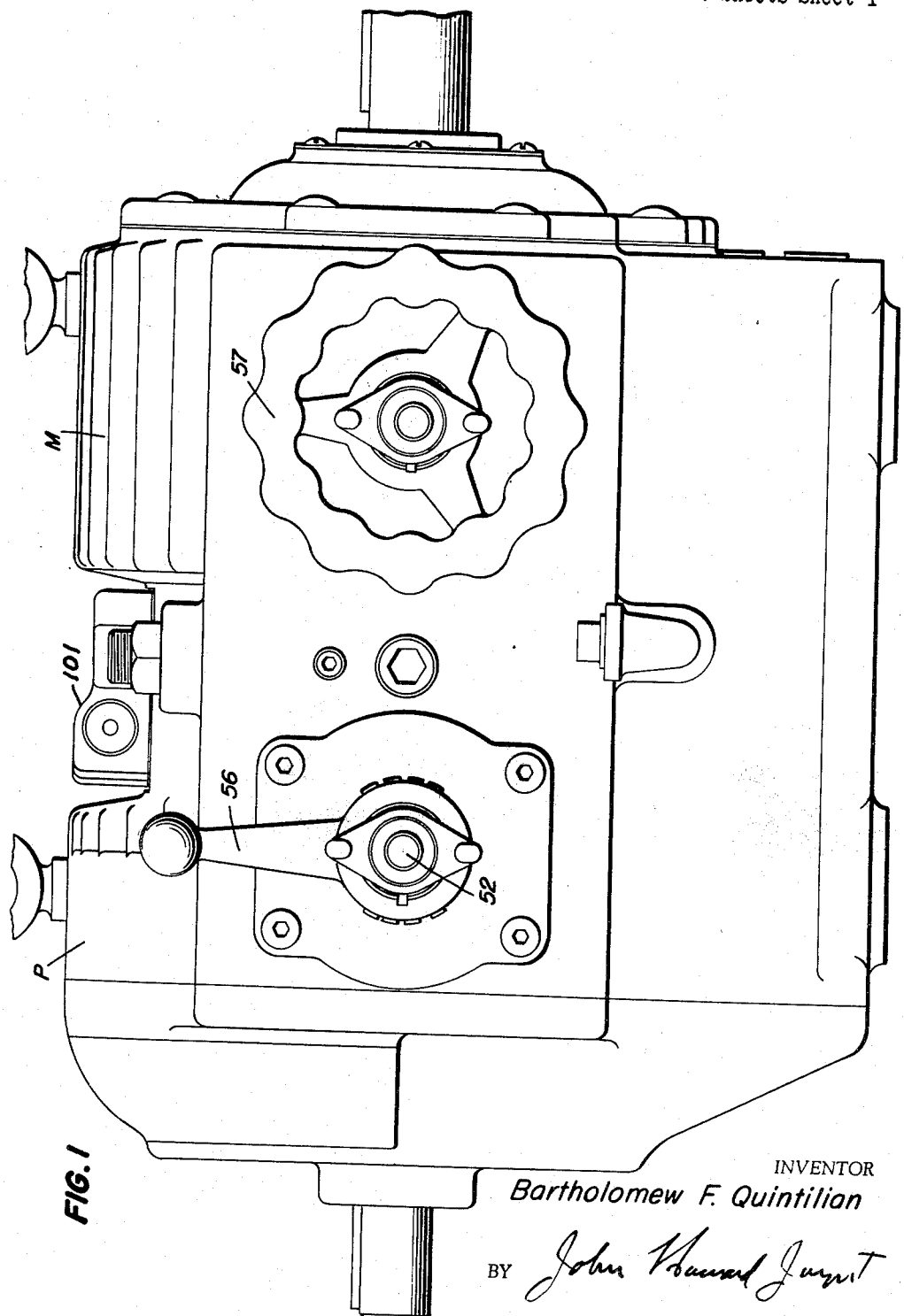
Fig. 1 is an elevation view of the complete assembly of the hydraulic transmission of my invention.

As shown in Fig. 1 movement of the control shaft 52 is obtained in the case of the pump by lever 56 and in the case of the fluid motor by handwheel 57. On the side of the casing opposite the control shaft (see Fig. 3) I position a spring loaded ram 58 maintained in contact with stroking member 51 by means of a helical spring 59 contained in recessed cap 60. By means of this backup spring all lost motion when shifting the casing is eliminated. To limit the stroke of the casing in either direction adjustable stop bolts 61 are provided. At the limit of the stroke, members 50 and 51 contact the bolt ends. By means of cap 60 and cap 62 unauthorized tampering with the limit bolts is eliminated.

By this arrangement I provide easy and rapid adjustment of the fluid pump and motor through the lever and handwheel by permitting movement of both the pump and motor vane rotor casings in either direction from concentric center with the rotor. It can also be seen that self-alignment is provided for with the many flexible mountings and a substantial reduction in wear on the parts is obtained.

The oil recirculation of my unit is to a great degree a closed circuit, but there is some loss of oil through the various parts due primarily to the high pressures of the unit. I find that approximately 90% of the oil is recirculated and only about 10% must be continuously replaced. My construction, with substantially the entire amount of fluid recirculated, has the advantage that the fluid agitation in the reservoir as commonly found in units which continuously replace substantially all of the pumped fluid is almost completely avoided.

The ball bearings 15 and 34 of the main pump and motor are completely lubricated by the high pressure motor slippage oil which is constantly supplied during the operation of the unit. This oil passes through the relatively moving operating parts to the easily accessible bearings.

In order to lubricate the pintle supporting needle bearings 24 at either end of the pintle, however, I provide radial passages 134 and 134M in shafts 11 and 18. These passages communicate with central bores 135 and 135M in the shafts to conduct slippage oil away from the needle bearings and thence to the reservoir.

As shown in Fig. 4, the pintle 20 is flexibly mounted, thus the pintle is provided with an enlarged center portion containing lateral wings 63 and 63$^1$. These wings contain central passages 64 and 65 which communicate with pintle passages 21 and 22 respectively. I provide on each side of the pintle center vertical bores 66 and 67 extending through the unit housing 10. By means of hollow jumper tubes 68 and 68$^1$ positioned in the housing and inserted into passages 64 and 65 respectively I provide fluid communication between the vertical bores and the pintle passage. The jumper tubes contain O ring gaskets 69 for fluid sealing which eliminates the necessity for press fitting the pintle wings into the housing and results in easier assembly and dismantling. With this type of mounting my pintle can turn slightly on its axis to resist the destructive effect of sudden loading.

In order to withstand the lateral pressure exerted on the pintle by reason of the difference in pressure between the two jumper tubes 68 and 68$^1$, and thereby on lateral wings 63 and 63$^1$, one being under pressure and the other under suction as noted, I employ (Fig. 2) a circular flange or collar 20a on the pintle, the outer circumference of which collar seats within the motor housing M and the conveniently abuts the base of ball bearing 15M. Breather holes 20b are located in the collar to permit a free flow of leakage oil for bearing lubrication. This construction, it will be noted, permits full end-play of the pintle. Moreover, it permits an axial tilt although restraining side-play and deflection. Where desired the flange may be made integral with the pintle.

Disposed within the vertical bores 67 and 66 are vertically adjustable valve shafts 70 and 70$^1$ containing hollow bores 71 and 71$^1$ for portions of their lengths. Each bore 71, 71$^1$ contains an upper lateral opening 72, 72$^1$ which communicates with jumper tubes 68 and 68$^1$ in passages 86 and 86$^1$, these passages being closed off by plugs 87 and 87$^1$. The valve shaft 70 contains a portion of reduced diameter 73 which provides fluid communication from a transverse passage 74 in the housing to the jumper tube and bore 71. Valve shaft 70$^1$, of course, is similarly constructed and provides communication of passage 74$^1$ with bore 71$^1$. These passages are sealed by plugs 187 and 187$^1$.

The valve shaft 70 extends downwardly into a fluid reservoir 39 in the hollowed out lower portion of the housing 10. I provide a plurality of hollow parallel cooling tubes 85 within the reservoir through which cooling air is circulated. I locate a guide ring 75 adjacent the valve shaft end for centering purposes and support this ring by means of a tubular member 76 which rests on a ported platform 77. At the upper end of the tube 76 I arrange a plurality of radial holes 78. Like platform 77$^1$ supports tubular member 76$^1$ and ring 75$^1$ for valve shaft 70$^1$.

Within the tube 76 I locate a vertically reciprocable poppet valve member 79 containing a ball check valve 80 biased by means of helical spring 81 into valve seating engagement with the open end of shaft 70. I employ a transverse pin 82 to maintain the ball in operating position. The platform 77 is removably positioned by snap ring 83 and sealed by O ring 8. And, here again, a like valve member 79$^1$ with ball check 80$^1$, spring 81$^1$ and pin 82$^1$ are provided for valve shaft 70$^1$. This valve assembly is maintained in position by snap ring 83$^1$ and its O ring 8$^1$.

With this arrangement a suction pressure within the bore 71 will move the ball valve 80 out of its seat and oil will be sucked from the reservoir through the ported platform 77, up the shaft and into the pintle. On the other hand, with a positive pressure the ball valve operates to seal the bore and no fluid flows. If this pressure becomes excessive the poppet valve 79 moves downwardly against the spring action to relieve the system and conduct the oil back into the reservoir 39 through ports 78. Valve 79$^1$ operates in like manner.

It can be seen that the pressure at which the valve shown at the left in Fig. 4 of the drawing depends upon the compressed length of the spring 81. This, in turn, depends on the position of the valve shaft 70. I, therefore, provide a slotted threaded portion thereof and lock nut on the top of the unit by which the shaft can be vertically adjusted to the desired position, the adjustment being of the position of the valve seat. Like provision is made for the valve shown at the right in Fig. 4.

With the unit in the position shown in Fig. 4, there is a pressure in pintle passage 21 and a suction in passage 22. Valve shaft 70 therefore serves to conduct the oil from the reservoir when replacement oil is required in excess of that supplied by the supercharger pump later described. Bore 66 as it is connected to the pressure passage 21 is sealed by means of the check valve and no oil flow results in the corresponding valve shaft 70$^1$. If the pressure is reversed in the pintle passages a reversal also occurs whereby bore 67 is sealed and bore 66 and valve 70$^1$ supplies the required replacement.

I have located the valves 79 and 79$^1$ as far apart as is practical in the unit design as I have found that the greater the distance there is between the valves the greater will be the reduction of the effect of highly agitated oil from one valve, when relieving, from entering the other valve. Also, I find that the increased distance also increases the cooling and baffling effect of cooling tubes 85 when oil is discharging from one valve and being drawn into the other.

The relief valves are completely disconnected from the pintle so that any vibrations in the valves are not reflected in the pintle. I also prevent the leakage of oil from around the valves 70, 70$^1$ by providing O rings 137 adjacent the upper and lower portions of the shafts.

When desired I provide at the upper end of passage 74 a recess 88 in housing 10 in which I locate a metallic hermetically sealed air "pillow" 89. Like provision is made for a "pillow" in passage 74$^1$. These pillows serve to damp out the pulsations of the pump and motor, reducing mechanical vibration and giving more quiet operation of the unit as a whole.

Figure 5:
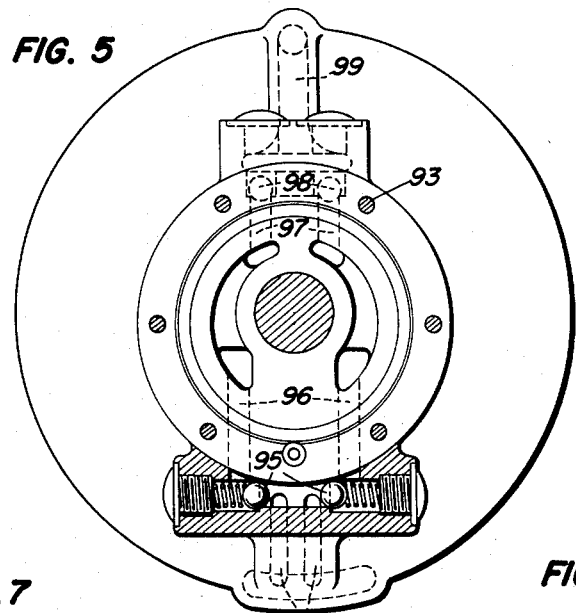
Fig. 5 is an elevation view of the pump end of the hydraulic transmission of Fig. 1, shown partly in section with certain parts removed.

In the preferred embodiment of my invention I position within pump end casing 90 (see Fig. 2) a supercharger pump 91 pinned to input shaft 11 for rotation therewith. The supercharger is shown in Fig. 5 partially in section. I enclose the supercharger with an end shield 92 secured to end casing 90 by means of a plurality of radial bolts 93. I provide two oil inlets 94 which conduct oil from reservoir 39 through two spring loaded check valves 95 into the supercharger through two passages 96. With this arrangement supercharger pumping can be obtained in either direction of shaft rotation as only the check valve on the suction side of the pump opens while the other remains closed. I also provide a pair of supercharger discharge conduits 97 sealed by gravity actuated ball check valves 98. Thus, only the passage through which the supercharger discharge flows is opened.

Within the fluid pump end casing 90 I provide a single passage 99 communicating with the supercharger outlet to conduct the discharged oil through passage 100 in the main housing to a valve 101 arranged on top of the housing as seen in Fig. 1. This valve is shown in Fig. 6. I provide a transverse bore 102 within the valve housing in which is disposed a spring loaded reciprocable valve member 103. I seal the ends of the bore with threaded caps 104 and 105. I load the valve member 103 by means of spring 106 into such a position that fluid communication is provided between passage 100 and passages 107 and 108 in the valve housing. The holding force of the spring can be adjusted by means of the position of cap 105.

The passages 107 and 108 lead into V-shaped passages 109, 109$^1$ in the main housing (see Fig. 4) in which ball check valves 110, 110$^1$ spring loaded upwardly are disposed. Passages 109, 109$^1$ are connected to vertical risers 111, 111$^1$ communicating with passages 74, 74$^1$.

In the operation of my unit under normal pressures the supercharger discharge is fed through the valve 101, around member 103, into passages 107 and 108 and into one of the passages 109, 109$^1$ in which the valves 110, 110$^1$ have become unseated due to suction pressure. Since the relief valves 79, 79$^1$ contain suction and pump pressure in opposite relationship, it can be seen that the valve containing pump pressure will hold the check valve in seated position through communicating passages 74 and 111 or 74$^1$ and 111$^1$ as the case may be. The supercharger discharge will therefore unseat the check valve 109 or 109$^1$ to communicate with the suction side relief valve and to the main pump inlet.

In the event that the supercharger pressure exceeds a predetermined value the valve member 103 will move against the action of spring 106 and permit the oil to flow into valve discharge passage 112, passages 113 and 114 in the main housing, into the reservoir 39. I find generally that a valve setting of approximately 50 p.s.i. gives a satisfactory performance for the unit. And the overflow oil in the overflowing through passages 113 and 114 splashes sufficiently to lubricate the inner ball bearings of the rotor and casing.

By keeping the system charged under back pressure I find that the tendency of the oil to vaporize under vacuum conditions is kept at an absolute minimum. Moreover, the supercharger pump principally replaces slippage oil, any excess replacement oil being supplied by the main valves as where the relief valve blows under overload conditions. Additionally, with the supercharger pump there is also a substantial reduction in the noise level of the unit. I feel that the reason for this is that the back pressure eliminates the turbulence in the pump due to cavitation.

Where it is necessary to reduce the cost of the unit, however, the supercharger pump may be eliminated along with the back pressure valve 101. If the supercharger is not used the slippage oil replacement is through one of the valves 79, 79$^1$ only.

Some benefit is had by a modified form of construction of passageways and check valves between supercharger and main valves 79 and 79$^1$. This I conveniently illustrate in Fig. 12 wherein a combined relief valve (not shown but like 101 of Fig. 6) and check valve 210 have main passages 207 and 208 with relief passage 212. Supercharger pressure, of course, is supplied both to passages 207 and 208, this tending to unseat the piston valve members 210 and 210¹, thus aiding the action of spring 209. But in one of the passages 211 and 211¹ there is suction and in the other there is pressure because of communication with the relief valves 79 and 79¹. The passage in suction, for example 211, further assures that the corresponding piston valve member will be retained in open position and thereby a flow of supercharged oil through the associated relief valve, 79 for the particular illustration, and to the main pump inlet. The valve passage under main pump pressure, however, 211¹ for the chosen example assures that piston valve member 210¹ is smartly forced to closing position against the action of the supercharged pressure in passage 208 and against the action of spring 209.

With a reversal in main pump direction it, of course, will be understood that the pressure and suction conditions are reversed. Pump pressure in pintle passage 22 and suction in passage 21 (see Fig. 4) give rise to suction conditions in valve passage 211¹, tending to aid the action of spring 209 and supercharged pressure in 208 holding valve piston member 210¹ in open position to permit free flow of oil for the supercharger, and pressure conditions in valve passage 211 will consequent closing of valve piston 210 under the force of the main pump pressure and against spring and supercharger pressures.

With my modified form of valve construction it will be seen that the closing force on the piston valve member acts on the companion valve member, this through the spring separating the two, and gives further assurance that that companion valve remains in open position. It is this aiding effect between piston valve members which assures a freedom from unnecessary opening and closing of valve members with slight variations in pump and pintle pressures resulting from load variations on the motor.

At the pump end of the unit (see Fig. 2) I have provided a fan 115 which is keyed to input shaft 11. This fan forces cooling air through passsages in the hood 116 into cooling tubes 67. These tubes are flexibly mounted in the lower portion of housing 10 by means of neoprene rubber O rings 117. Therefore, these tubes, which are surrounded by the reservoir oil, can expand and contract with changes in oil temperature without setting up thermal stresses.

Figure 9:
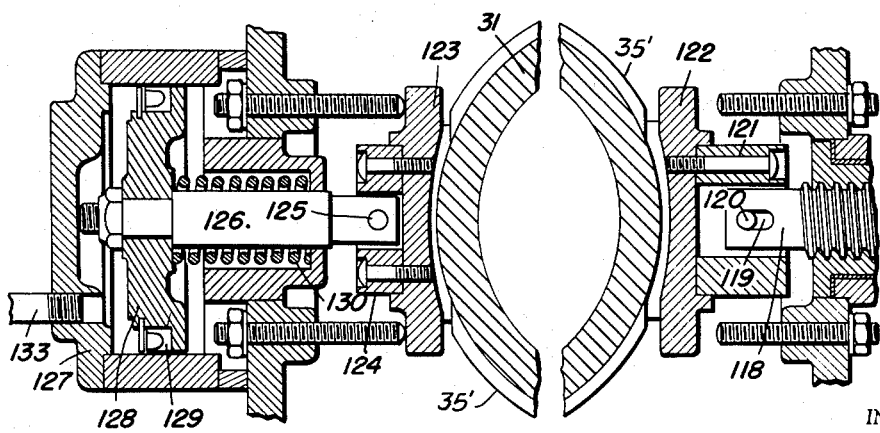
Fig. 9 is a partial view of an alternate embodiment of the control mechanism of my invention.

An alternative embodiment of the control mechanism of my invention is shown in Fig. 9 where remote control is provided for. The manual control shaft 118 of the main pump is provided with a lost motion coupling aperture 119 through which pin 120 is inserted. This pin is mounted within a ring 121 fixed to stroking member 122 in a manner similar to that of the construction shown in Fig. 3 to permit axial alignment. On the opposite side of the rotor casing 31 stroking member 123 also contains a ring 124 connected by means of pin 125 to a slidable shaft 126. Mounted on this shaft and sealed within cylinder housing 127 is a piston 128 provided with a suitable sealing ring 129. By means of spring 130 surrounding the shaft 126 the piston is biased to the left, as seen in Fig. 9. Stroking members 123 and 122 as well as rotor housing 31 are then likewise biased to the left, the biasing movement being permitted by slot 119 in shaft 118 of the hand control.

Oil pressure from the supercharger pump is conducted by means of conduit 133 into cylinder 127 where it forces the piston to the right to stroke the rotor casing 31 over to a position where pin 120 is flush against the end of aperture 119.

When the oil pressure from the supercharger is sufficiently reduced the piston 128 moves to the left under spring action to correspondingly move housing 31, to return the rotor casing to the neutral position, or to reverse as desired. This movement is permitted because of the lost motion in aperture 119. In this manner I may obtain the effect of a braking action as the load of the main fluid motor M overrides the motor making it act as a pump. The oil is then delivered to the main pump P which is in neutral. Since there is no displacement the relief valve 79 or 79¹ then blows. The energy is dissipated in the relief valve in the form of heat.

The above described arrangement for remote control operation of pump P may also be utilized to control the motor M.

Where desired the operation of my hydraulic transmission may be reversed, making the motor the pump and the pump the motor. This operation has the advantage of converting the low speed operation of the end of my transmission, normally the motor, to the high speed operation of the end, normally the pump.

Thus it will be seen that there is provided in my invention a hydraulic transmission, and pump and motor, in which the various objects hereinbefore set forth are successfully achieved. My hydraulic power transmission is adapted to transmit power from a driving device to a driven device in a smooth uninterrupted flow under either manual or automatic control throughout a wide range of speed and torque limited only by capacity of the unit in either direction of rotation. My device is simple and rugged in construction with self-lubricating and self-aligning characteristics and operates with an absolute minimum of noise and vibration in a highly efficient manner with a substantial reduction in friction and wear.

As many possible embodiments may be made of my invention, and as many changes may be made in the embodiments hereinbefore set forth, it is to be understood that all matter herein, whether shown or described, is to be interpreted as illustrative and not as a limitation.

I claim as my invention:

1. In a hydraulic transmission, a housing; a fluid pump with drive shaft positioned within said housing; a fluid motor with driven shaft also positioned within said housing and in axial alignment with said pump; conduit means establishing fluid communication between said pump and said motor; and bearing means supporting the ends of said conduit means, said conduit means including two axial passages for establishing such fluid communication between said pump and motor and at different pressures, and collar means intermediate the length of said conduit means and between the same and said housing for supporting said conduit means against deflection under such pressure differences yet allowing end-play and axial tilt.

2. In a hydraulic transmission, a housing; a fluid pump with drive shaft positioned within said housing; a fluid motor with driven shaft also positioned within said housing and in axial alignment with said pump, said pump and motor shafts having projecting end portions; conduit means establishing fluid communication between pump and motor, said means having a flanged mid-portion supported by said housing and restraining side-play and deflection of said conduit means yet permitting end-play and axial tilt of the same and having open end portions accepting the projecting end portions of said shafts; and bearing means supporting the end portions of said conduit means on the end portions of said shafts.

3. In a hydraulic transmission, a housing; a fluid pump with drive shaft positioned within said housing; a fluid motor with driven shaft also positioned within said housing and in axial alignment with said pump, said pump and said motor having hollow hub portions; conduit means having end portions thereof received within the hollow hub portions of pump and motor and having passages establishing fluid communication between said pump and motor; bearing means received between said pump and said motor hub portions and said end portions of said conduit means and supporting the ends of said conduit means coaxially with said pump and motor with a minimum of friction; and collar means about said conduit means intermediate the length thereof and supporting a mid-portion of the same against deflection resulting from a difference of fluid pressure in said passages of said conduit means although allowing end-play and axial tilt.

4. In a hydraulic transmission, a housing; a pair of substantially identical unit structures supported within said housing each of which consists of a rotor having alternating radial slots and radial chambers, vanes movable in said radial slots, and a rotatable casing enclosing said rotor to form with the rotor two groups of working chambers formed by said vanes; an axial member containing inner passages communicating the two groups of working chambers of one unit with the two groups of working chambers of the other to provide a flow of pressurized fluid between said two units; passage means in said axial member and said unit structures for said pressurized fluid to bias all vanes radially outwardly at full pressure; and means in the form of a ring about said axial member intermediate the length thereof and contacting said housing and supporting a mid-portion of said member against deflection resulting from any difference of pressure of the inner passages of the same yet allowing end-play and axial tilt.

5. In a hydraulic transmission, a housing; a conduit member having a pair of overlying axial passages axially disposed within said housing, said axial passages terminating at each end of said member in lateral openings and also having mid-lateral openings therein, one for each of said axial passages; a pair of substantially identical unit structures supported within said housing each of which consists of a rotor having alternating radial slots and radial chambers, vanes radially movable in said radial slots, a rotatable casing enclosing said rotor and shiftable relative to said rotor to form with the rotor two groups of working chambers communicating by said radial chambers with said axial passages, said unit structure and axial passages providing a substantially closed fluid circuit; a fluid reservoir in said housing; tubular members resiliently mounted within said mid-lateral openings of said conduit member and resiliently positioned in said main housing to resist the effect of sudden loading; means communicating said tubular members with said reservoir; valve means in said last mentioned means responsive to suction in one of said axial passages whereby fluid is drawn from said reservoir and fed to said circuit through one of said tubular members to replace fluid lost from leakage; and pivotal means intermediate the length of said conduit member supporting said member against deflection resulting from any difference in pressure of the fluid in said axial passages thereof yet allowing end-play and axial tilt.

6. In a hydraulic transmission, a housing; a fluid pump and a fluid motor positioned within said housing; an axially disposed conduit member with two lateral wings midway thereof and having a pair of axial passages in said member, one communicating with one wing and the other with the other wing and establishing fluid communication between said pump and motor, one of said passages and lateral wing adapted to transmit pressurized fluid and the other passage and lateral wing to transmit fluid in response to suction in a substantially closed circuit; a fluid reservoir; two vertically adjustable tubular columns communicating said fluid reservoir therewith, said columns being on opposite sides of said axially disposed member and one being resiliently connected to one wing and axial passage of the same and the other being resiliently connected to the other wing and axial passage and assuring slight rotation of said conduit member about the axis thereof to resist the effect of sudden loading; a check valve in each said column opening in response to suction pressure while remaining closed under positive pressure; a further valve member in each column and having valve seat piston thereon; and a spring biasing each of said valve members into seating position with the seat pistons of said column, with said spring compressed by said vertically adjustable column to desired setting, said valve members being movable under a predetermined positive pressure to communicate one of said axial passages with said fluid reservoir.

7. In a hydraulic transmission, a housing; a fluid pump and a fluid motor positioned within said housing; an axially disposed conduit member containing a pair of axial passages permitting fluid communication between said pump and motor, one of said passages adapted to transmit pressurized fluid and the other passage to transmit fluid in response to suction in a substantially closed circuit; a fluid reservoir; two vertically adjustable tubular columns, one adjacent each axial passage and communicating said fluid reservoir therewith, said columns being disposed on opposite sides of said conduit member and being connected by resilient means, one to each of said axial passages in said conduit member midway along the length thereof to assure slight rotation of said conduit member about the axis thereof to resist the effect of sudden loading; auxiliary pump means communicating by means of a passage in said housing with each column; a normally closed check valve in each said passage; pressure relief means conneced to said auxiliary pump means; normally closed valve means in each column opening in response to suction while remaining closed under positive pressure, said pump means communicating simultaneously under said suction pressure with said column only; and a valve member in each column biased into seating position by way of an adjustable spring, said valve member movable under a predetermined positive pressure to communicate one of said axial passages with said fluid reservoir.

8. In a hydraulic transmission, a housing; a fluid pump and a fluid motor positioned within said housing; an axially disposed conduit member having a pair of oppositely disposed lateral wings about midway along the length thereof with axial passages in said member and wings establishing fluid communication between said pump and motor, one of said passages adapted to transmit pressurized fluid and the other passage to transmit fluid in response to suction in a substantially closed circuit; a fluid reservoir; two vertical tubular columns, one adjacent each axial passage and communicating said fluid reservoir therewith, said columns being disposed on opposite sides of said axially disposed member; resilient means connecting said columns, one to each of said axial passages in said axially disposed conduit member by way of said lateral wings to assure slight rotation of said conduit member to resist the effect of sudden loading; a check valve in each said column opening in response to suction while remaining closed under positive pressure; two further valve members, one in each column biased into seating position with said column by way of a spring, said valve members being movable under predetermined pressure to communicate one of said axial passages with said fluid reservoir; and a passageway communicating with said tubular columns and having a sealed air-pillow therein to damp out fluctuations in a fluid circuit which may arise from operation of said check valves and further valve members.

References Cited in the file of this patent

UNITED STATES PATENTS

| | | |
|---|---|---|
| 466,660 | Duncan | Jan. 5, 1892 |
| 1,266,606 | Manly | May 21, 1918 |
| 1,904,496 | Maw | Apr. 18, 1933 |
| 2,035,465 | Erskine et al. | Mar. 31, 1936 |
| 2,141,171 | Centervall | Dec. 27, 1938 |
| 2,159,941 | Guinness | May 23, 1939 |
| 2,186,409 | Ferris | Jan. 9, 1940 |
| 2,227,631 | Carter | Jan. 7, 1941 |
| 2,238,062 | Kendrick | Apr. 15, 1941 |
| 2,363,983 | Miller | Nov. 28, 1944 |
| 2,646,755 | Joy | July 28, 1953 |
| 2,668,417 | Gleasman | Feb. 9, 1954 |
| 2,669,935 | Tucker | Feb. 23, 1954 |
| 2,818,707 | Sturm | Jan. 7, 1958 |
| 2,821,928 | Wagner | Feb. 4, 1958 |